(12) United States Patent
Kim et al.

(10) Patent No.: US 11,710,446 B2
(45) Date of Patent: Jul. 25, 2023

(54) LED DRIVING DEVICE AND LED DRIVING METHOD

(71) Applicant: SILICON WORKS CO., LTD., Daejeon (KR)

(72) Inventors: Ji Hwan Kim, Daejeon (KR); Jin Ho Choi, Daejeon (KR); Jang Su Kim, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/377,174

(22) Filed: Jul. 15, 2021

(65) Prior Publication Data

US 2022/0028328 A1    Jan. 27, 2022

(30) Foreign Application Priority Data

Jul. 21, 2020    (KR) .................. 10-2020-0090175

(51) Int. Cl.
*G09G 3/32*    (2016.01)
*H05B 45/325*    (2020.01)
*H05B 45/397*    (2020.01)

(52) U.S. Cl.
CPC ............. *G09G 3/32* (2013.01); *H05B 45/325* (2020.01); *H05B 45/397* (2020.01); *G09G 2310/08* (2013.01); *G09G 2330/021* (2013.01)

(58) Field of Classification Search
CPC ........ G09G 3/32; G09G 3/3241; H05B 45/46; H05B 39/02
See application file for complete search history.

(56) References Cited

U.S. PATENT DOCUMENTS

| | | | |
|---|---|---|---|
| 7,034,787 B2* | 4/2006 | Date | G09G 3/3685 345/89 |
| 10,165,633 B2 | 12/2018 | Furukawa | |
| 10,172,194 B2 | 1/2019 | Furukawa | |
| 10,178,721 B1* | 1/2019 | Huang | H05B 45/3725 |
| 2007/0216638 A1* | 9/2007 | Kojima | G09G 3/3413 345/102 |
| 2010/0156317 A1* | 6/2010 | Arai | G09G 3/342 315/294 |
| 2012/0188293 A1 | 7/2012 | Furukawa | |
| 2015/0154904 A1* | 6/2015 | Lin | G09G 3/3283 315/210 |
| 2015/0257220 A1 | 9/2015 | Furukawa | |

FOREIGN PATENT DOCUMENTS

KR    10-1338903 B1    12/2013
KR    10-1991514 B1    6/2019

* cited by examiner

*Primary Examiner* — Kevin M Nguyen
(74) *Attorney, Agent, or Firm* — Rothwell, Figg, Ernst & Manbeck, P.C.

(57) ABSTRACT

The present disclosure relates to an LED driving technology. According to the present disclosure, it is possible to increase the fineness of the gray scale without increasing a frequency of a clock by combining a plurality of driving current sources to generate a driving current supplied to one driving line.

17 Claims, 10 Drawing Sheets

@RGB = 9

LED DRIVING DEVICE AND LED DRIVING METHOD

CROSS REFERENCE TO RELATED APPLICATION

This application claims priority from Republic of Korea Patent Application No. 10-2020-0090175, filed on Jul. 21, 2020, which is hereby incorporated by reference in its entirety.

BACKGROUND

1. Field of Technology

The present disclosure relates to light emitting diode (LED) driving technology.

2. Description of the Prior Art

In line with the development of information, various display devices capable of visualizing information are being developed. A liquid crystal display (LCD) device, an organic light-emitting diode (OLED) display device, a plasma display panel (PDP) display device, and the like are typical examples of display devices that have been developed recently or are currently being developed. These display devices are progressing so as to appropriately display high-resolution images.

However, although the above-described display devices have advantages of high resolution, they have disadvantages that enlargement thereof is difficult. For example, large OLED display devices developed so far are just 80 inches (approximately 2 m) to 100 inches (approximately 2.5 m), so it is not suitable for producing large display devices having a width of 10 m or more.

Recently, interest in light emitting-diode (LED) display devices has increased as a method to solve the problem with enlargement of the display. In the LED display device technology, a single large panel may be configured by disposing a required number of modular LED pixels. Alternatively, in the LED display device technology, a single large panel structure may be configured by disposing a required number of unit panels including a plurality of LED pixels. As described above, in the LED display device technology, a large display device may be easily implemented by expanding and arranging a number of LED pixels as needed.

LED display devices have advantages in diversification of panel sizes, as well as in enlargement of the panel. In the LED display device technology, it is possible to adjust the horizontal and vertical sizes according to appropriate arrangement of LED pixels.

Meanwhile, the LED display device may adjust the brightness of the LED through pulse width modulation (PWM) control, but the conventional LED display devices do not have many adjustable levels of brightness, and thus have a problem with low color expression. In other words, the conventional LED display devices have a problem of not being able to finely adjust the gray scale.

SUMMARY OF THE INVENTION

Against this background, in one aspect, the present disclosure provides a technology allowing more precisely expressing the gray scale in an LED display device. In another aspect, the present disclosure provides a technology for increasing the range of gray scale values without changing a clock in an LED display device. In another aspect, the present disclosure provides a technology for controlling the gray scale by combining a plurality of driving current sources in an LED display device. In another aspect, the present disclosure provides a technology allowing lowering electro-magnetic interference (EMI) due to a clock in an LED display device.

In view of the foregoing, in an aspect, the present disclosure provides a light emitting diode (LED) driving device for driving a plurality of LEDs arranged on a panel, which may comprise: a plurality of driving current sources connected in parallel to each other; a pulse width modulation (PWM) controlling circuit configured to generate a plurality of PWM signals according to a gray scale value for an LED; and a plurality of switch circuits configured to control an output of each driving current source for the LED according to each PWM signal.

Each PWM signal may comprise an ON section and an OFF section and the length of the ON section may be adjusted in units of cycles of a clock.

A difference in the length of the ON section between the PWM signals may be within the length of one cycle of the clock.

The gray scale value may have a range corresponding to 2 to the power of N (N is a natural number).

The number of the plurality of driving current sources may be N.

The PWM controlling circuit may be configured to assign a value of a quotient, obtained by dividing the gray scale value by N, to each of the driving current sources and distribute remainder R (R is 0 or a natural number less than N) respectively to R driving current sources to generate the plurality of PWM signals.

The levels of the driving currents outputted from respective driving current sources may be substantially identical.

The plurality of driving current sources may be implemented in a form of current mirrors with respect to one common current source.

Another embodiment provides an LED driving device for driving an LED arranged on a panel, which may comprise: a first driving current source; a second driving current source connected in parallel to the first driving current source; a PWM controlling circuit configured to generate a first PWM signal and a second PWM signal by distributing a gray scale value for the LED; a first switch circuit configured to control an output of the first driving current source for the LED according to the first PWM signal; and a second switch circuit configured to control an output of the second driving current source for the LED according to the second PWM signal.

The PWM controlling circuit may be configured to adjust the lengths of ON sections of the first PWM signal and the second PWM signal in units of cycles of a clock.

The PWM controlling circuit may control the first PWM signal and the second PWM signal such that the lengths of their ON sections are identical to each other or such that a difference in the length of the ON section therebetween is within the length of one cycle of the clock.

Another embodiment provides a method of driving a plurality of LEDs arranged on a panel, which may include: connecting one LED to one driving line according to a scan signal; identifying image data including a gray scale value for the one LED; dividing the gray scale value into N gray scale values (N is a natural number of 2 or higher) and generating a plurality of PWM signals according to the divided gray scale values; and controlling outputs of N driving current sources connected to the one driving line according to the plurality of PWM signals.

Controlling the outputs of the N driving current sources may comprise dividing one frame into M subframes (M is a natural number of 2 or higher), controlling the outputs of the N driving current sources such that (M−1) subframes respectively have ON sections having a same length, and controlling the outputs of the N driving current sources such that one remaining subframe has an ON section having a length different from the lengths of the ON sections in the (M−1) subframes by the length of one cycle of a clock.

Controlling the outputs of the N driving current sources may comprise dividing one frame into M subframes (M is a natural number of 2 or higher) and controlling the outputs of the N driving current sources such that a difference between two ON sections of two driving power sources is within one clock cycle in each subframe and such that a difference between any two sums of the ON sections of the N driving current sources assigned to two subframes is within one clock cycle.

As described above, according to the present disclosure, an LED display device allows expressing the gray scale more precisely. In addition, according to the present disclosure, an LED display device allows increasing the range of gray scale values without changing a clock, and allows lowering electro-magnetic interference (EMI) due to the clock.

DETAILED DESCRIPTION OF THE EXEMPLARY EMBODIMENTS

Figure 1:
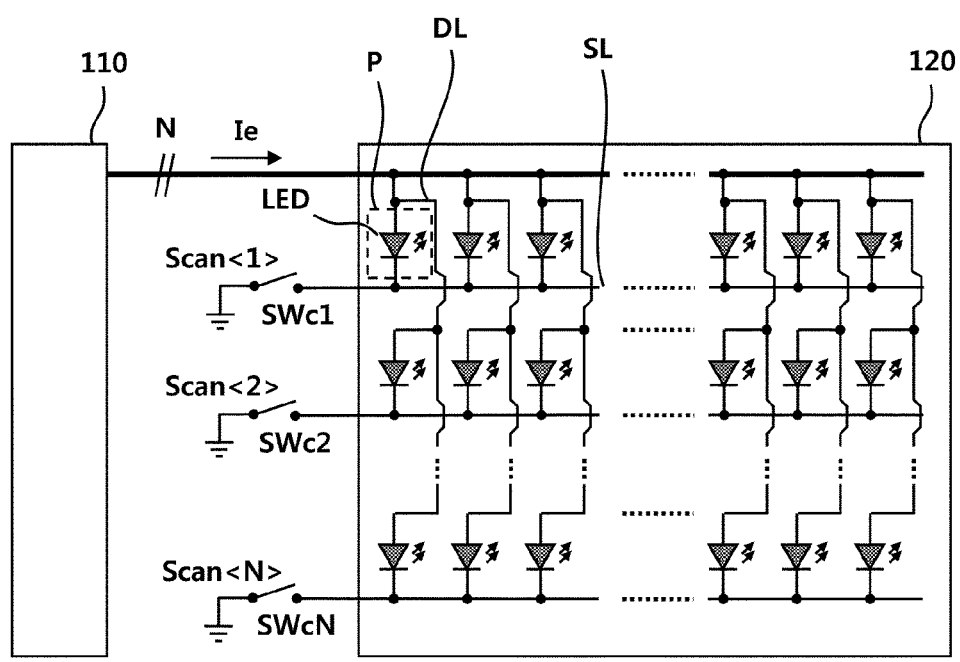
FIG. 1 is a diagram illustrating the configuration of a display device according to an embodiment.

FIG. 1 is a diagram illustrating the configuration of a display device according to an embodiment.

Referring to FIG. 1, a display device 100 may include a driving device 110 and a panel 120.

The panel 120 may have a plurality of pixels P arranged in a matrix in a first direction (e.g., a horizontal direction in FIG. 1) and a second direction (e.g., a vertical direction in FIG. 1).

At least one light-emitting diode (LED) may be disposed in each pixel P, and the brightness of the pixel P may be determined according to the brightness of the LED.

Driving lines DL and scan lines SL may be arranged on the panel 120. The driving lines DL may connect one sides of the pixels in the second direction, and the scan lines SL may connect the opposite sides of the pixels in the first direction. For example, an anode of the LED disposed in the pixel P may be electrically connected to the driving line DL, and the cathode of the LED may be electrically connected to the scan line SL. In the aspect that the cathodes of the LEDs are commonly connected, the example shown in FIG. 1 may be called a "common cathode structure", but the present disclosure is not limited to this structure.

Scan switches SWc1, SWc2, . . . , and SWcN may be disposed on the respective scan lines SL, and a scan line SL through which a driving current Ie is supplied may be determined according to the opening and closing of the scan switches SWc1, SWc2, . . . , and SWcN.

Figure 2:
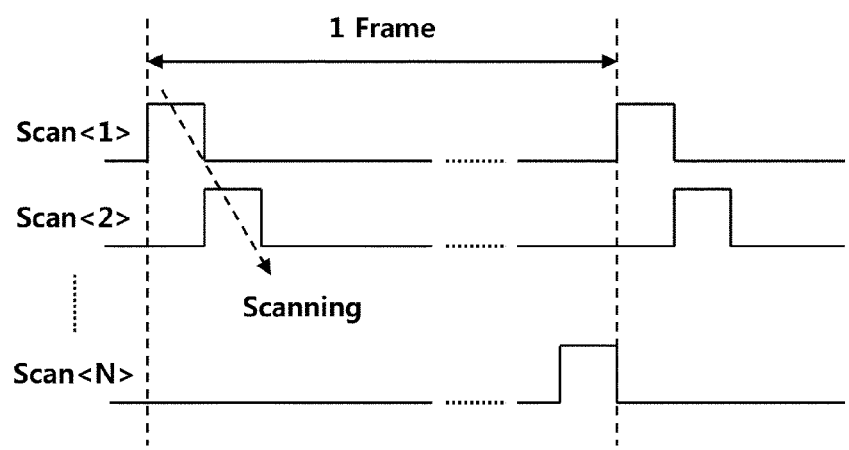
FIG. 2 is a diagram illustrating waveforms of scan signals in a display device according to an embodiment.

FIG. 2 is a diagram illustrating waveforms of scan signals in a display device according to an embodiment.

Referring to FIGS. 1 and 2, scan signals Scan<1>, Scan<2>, . . . , and Scan<N> may be sequentially supplied to the respective scan switches SWc1, SWc2, . . . , and SWcN for each frame unit. The driving current Ie may be sequentially supplied to a first scan line, a second scan line, . . . , and an Nth scan line according to the scan signals Scan<1>, Scan<2>, . . . , and Scan<N>.

The scan line SL may be connected to a low voltage part such as the ground in the display device 100. In addition, the scan switches SWc1, SWc2, . . . , and SWcN may be formed on the panel 120, or may be formed on a separate substrate, and may be formed inside the driving device 110 according to an embodiment.

The scan signals Scan<1>, Scan<2>, . . . , and Scan<N> may be supplied by the driving device 110, or may be supplied by a separate control device.

The brightness of an LED arranged in each pixel P may be determined depending on the amount of driving power supplied within a predetermined time. The LED may be driven by pulse width modulation (PWM), and the brightness thereof may be determined depending on the ratio of a turn-on time to the PWM control time. When the LED is turned on by the driving current Ie, a forward voltage may be formed in the LED, and the amount of driving power supplied to the LED may be obtained by accumulating the product of the forward voltage and the driving current Ie for a turn-on time within the PWM control time so that the brightness of the LED may be determined according to the amount of driving power. Assuming that the magnitudes of the forward voltage and the driving current Ie of the LED are fixed variables, the amount of driving power is proportional to the turn-on time in the PWM control time, and the driving device 110 may control the turn-on time in the PWM control time according to this principle, thereby controlling the brightness of the LED and the brightness of the pixel P.

The driving device 110 may include a plurality of (N) channels connected to the driving lines DL, and may supply the driving current Ie to each pixel P in each channel Meanwhile, the PWM signal that determines the gray scale of the pixel P may be configured as an ON section and an OFF section, and the length of the ON section may be adjusted by the cycle unit of the clock. Accordingly, in order to increase the fineness of the gray scale, the cycle of the clock must be shortened. However, it is not easy to shorten the cycle of the clock, i.e., to increase a clock frequency, so it is difficult to increase the fineness of the gray scale in the conventional LED display device.

The LED driving device may receive image data from an image control device, and may also receive a data clock capable of reading image data in units of bits. In addition, the LED driving device may generate a clock used internally using the data clock received from the outside as described above. The clock used internally may be referred to as "GCLK", and the clock GCLK interworks with a data clock received from the outside, so changing the same is not easy. For this reason, it is different to increase the fineness of the gray scale in the conventional LED display device.

In order to overcome this problem, an embodiment provides a technology for increasing the fineness of the gray scale by combining a plurality of driving current sources.

Figure 3:
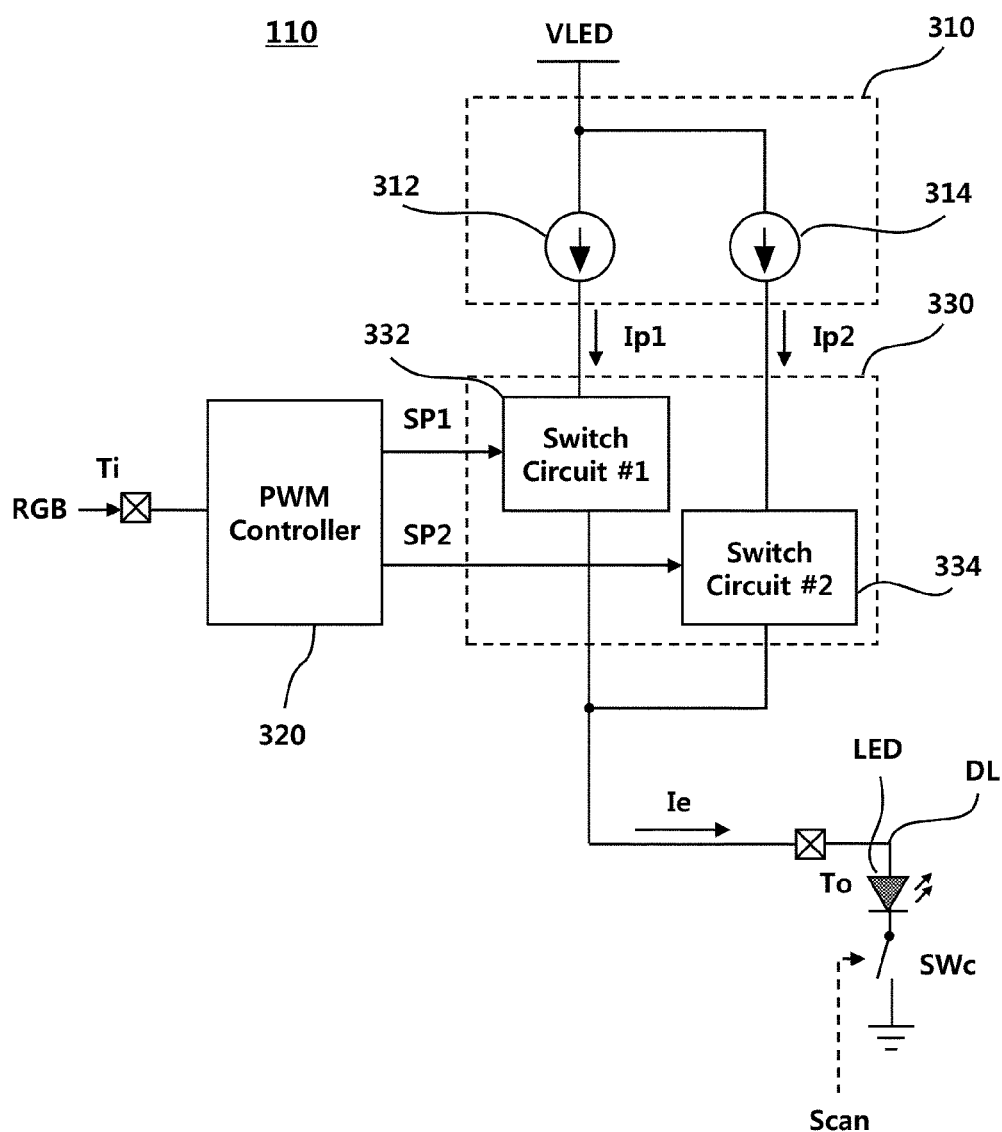
FIG. 3 is a diagram illustrating the configuration of an LED driving device according to a first example of an embodiment.

FIG. 3 is a diagram illustrating the configuration of an LED driving device according to a first example of an embodiment.

Referring to FIG. 3, an LED driving device 110 may include a driving current source circuit 310, a PWM controlling circuit 320, and switch circuit part 330.

The driving current source circuit 310 may include a first driving current source 312 and a second driving current source 314. The first driving current source 312 and the second driving current source 314 may be connected in parallel to each other, and may supply the driving current Ie to one driving line DL. The first driving current source 312 may supply a first driving current Ip1 to the driving line DL, and the second driving current source 314 may supply a second driving current Ip2 to the driving line DL, and the driving current Ie flowing through the driving line DL may be the sum of the first driving current Ip1 and the second driving current Ip2.

A plurality of LEDs LED may be connected to one driving line DL, and the respective LEDs LED may be sequentially connected to the driving line DL according to the scan signal.

The PWM controlling circuit 320 may receive image data RGB through an input terminal Ti, and may generate PWM signals SP1 and SP2 according to a gray scale value included in the image data RGB.

The PWM controlling circuit 320 may distribute the gray scale value to the first driving current source 312 and the second driving current source 314, respectively. For example, if the gray scale value is 9, the PWM controlling circuit 320 may distribute 6 to the first driving current source 312, and may distribute 3 to the second driving current source 314.

The PWM controlling circuit 320 may distribute the gray scale value to the first driving current source 312 and the second driving current source 314 in a balanced way. For example, if the gray scale value is 8, the PWM controlling circuit 320 may distribute 4 to the first driving current source 312, and may distribute 4 to the second driving current source 314. If the gray scale value is divisible by the number of driving current sources, the PWM controlling circuit 320 may evenly distribute the gray scale value to the first driving current source 312 and the second driving current source 314.

If the gray scale value is not divisible by the number of driving current sources, the PWM controlling circuit 320 may evenly distribute the gray scale value to the respective driving current sources until the last portion capable of being equally distributed, and may then evenly distribute the remainder to some driving current sources selected among the driving current sources. For example, the PWM controlling circuit 320 may distribute, to each driving current source, the quotient Q obtained by dividing the gray scale value by the number of driving current sources, and may equally distribute the remainder R to the driving current sources selected from among the driving current sources. In the case of two driving current sources as shown in the first embodiment, the PWM controlling circuit 320 may distribute the quotient Q obtained by dividing the gray scale value by 2 to the first driving current source 312 and the second driving current source 314, and may distribute the remainder R to the first driving current source 312. For example, if the gray scale value is 9, the PWM controlling circuit 320 may distribute 5 to the first driving current source 312, and may distribute 4 to the second driving current source 314.

The PWM controlling circuit 320 may generate the PWM signals SP1 and SP2 using the values distributed to the respective driving current sources. The PWM controlling circuit 320 may generate a first PWM signal SP1 using the value distributed to the first driving current source 312, and may generate a second PWM signal SP2 using the value distributed to the second driving current source 314.

The output Ip1 of the first driving current source 312 may be controlled according to the first PWM signal SP1, and the output Ip2 of the second driving current source 314 may be controlled according to the second PWM signal SP2.

A plurality of switch circuits may be disposed in the switch circuit part 330, and each switch circuit may control the output of each corresponding driving current source. For example, the first switch circuit 332 may control the output of the first driving current source 312 according to the first PWM signal SP1, and the second switch circuit 334 may control the output of the second driving current source 314 according to the second PWM signal SP2.

The driving current Ie controlled according to the PWM signals SP1 and SP2 may be supplied to the driving line DL through an output terminal To.

Figure 4:
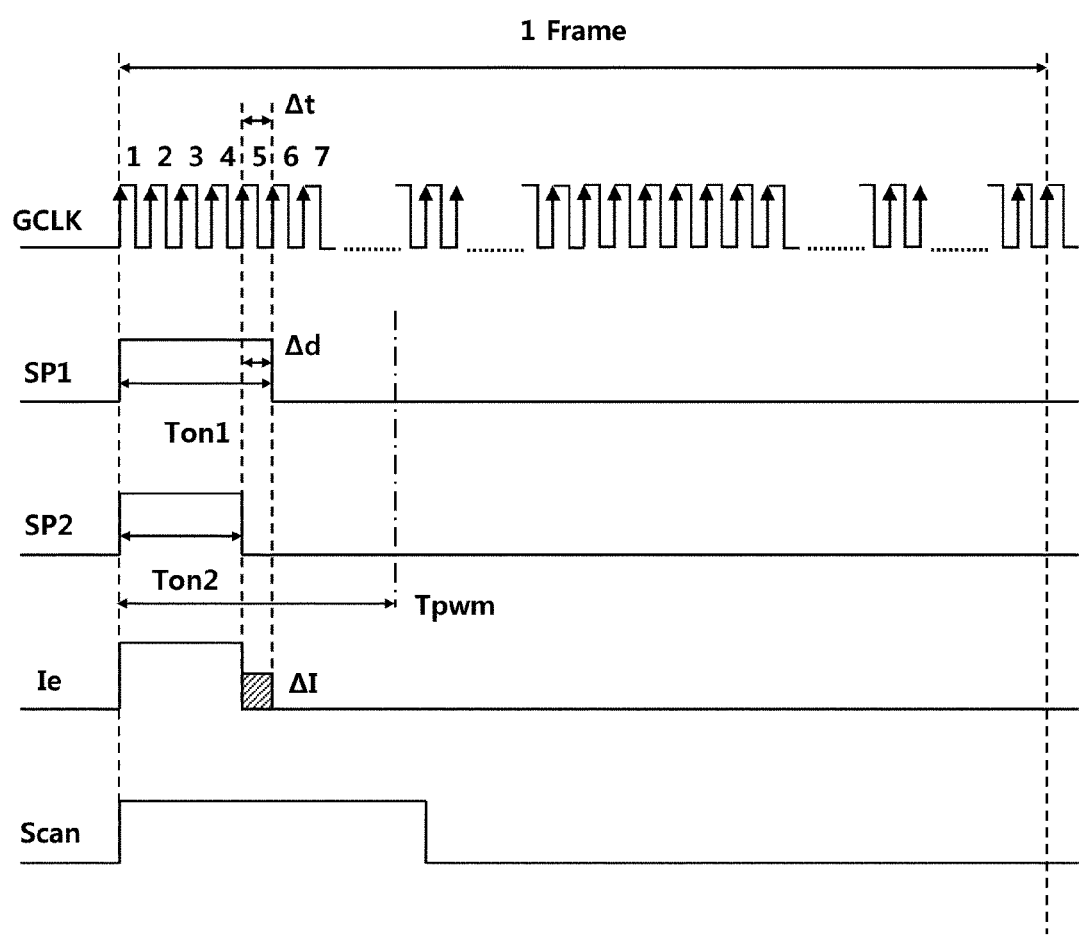
FIG. 4 is a diagram illustrating primary waveforms in the first example.

FIG. 4 is a diagram illustrating primary waveforms in the first example.

Referring to FIG. 4, a PWM control time Tpwm of the PWM signal SP1 or SP2 may be configured as an ON section and an OFF section. The LED driving device may supply the output of each driving current source to the driving line in the ON section, and may block the output of each driving current source in the OFF section.

The LED driving device may have a clock GCLK, and may adjust the length of the ON section in the PWM signal SP1 or SP2 according to the clock GCLK. The LED driving device may adjust the length of the ON section such that one unit of the gray scale value corresponds to one cycle $\Delta t$ of the clock GCLK. For example, if the gray scale value is 1, the length of the ON section may be equal to one cycle of the clock GCLK.

The LED driving device may adjust the length of the ON sections Ton1 and Ton2 of the first PWM signal SP1 and the second PWM signal SP2 in units of cycles $\Delta t$ of the clock GCLK such that the length of the ON section Ton1 of the first PWM signal and the length of the ON section Ton2 of the second PWM signal are the same or such that a difference $\Delta d$ between the length of the ON section of the first PWM signal and the length of the ON section of the second PWM signal is one clock cycle $\Delta t$.

For example, if the gray scale value included in image data RGB is 9, the LED driving device may configure the ON section of the first PWM signal so as to correspond to 5 clock cycles $\Delta t$, and may configure the ON section of the second PWM signal so as to correspond to 4 clock cycles $\Delta t$.

The magnitude of the driving current Ie may equal to the sum of a first driving current output from the first driving current source and a second driving current output from the second driving current source. In this case, the magnitude ΔI of the current in the section in which only the first driving current source outputs the current may be smaller than the magnitude of the current in the section in which both the first driving current source and the second driving current source output the currents, thereby increasing the fineness of the gray scale value.

The first driving current output from the first driving current source and the second driving current output from the second driving current source may have substantially the same magnitude. In this case, according to the LED driving method described above, the fineness of the gray scale value may be doubled.

Figure 5A:
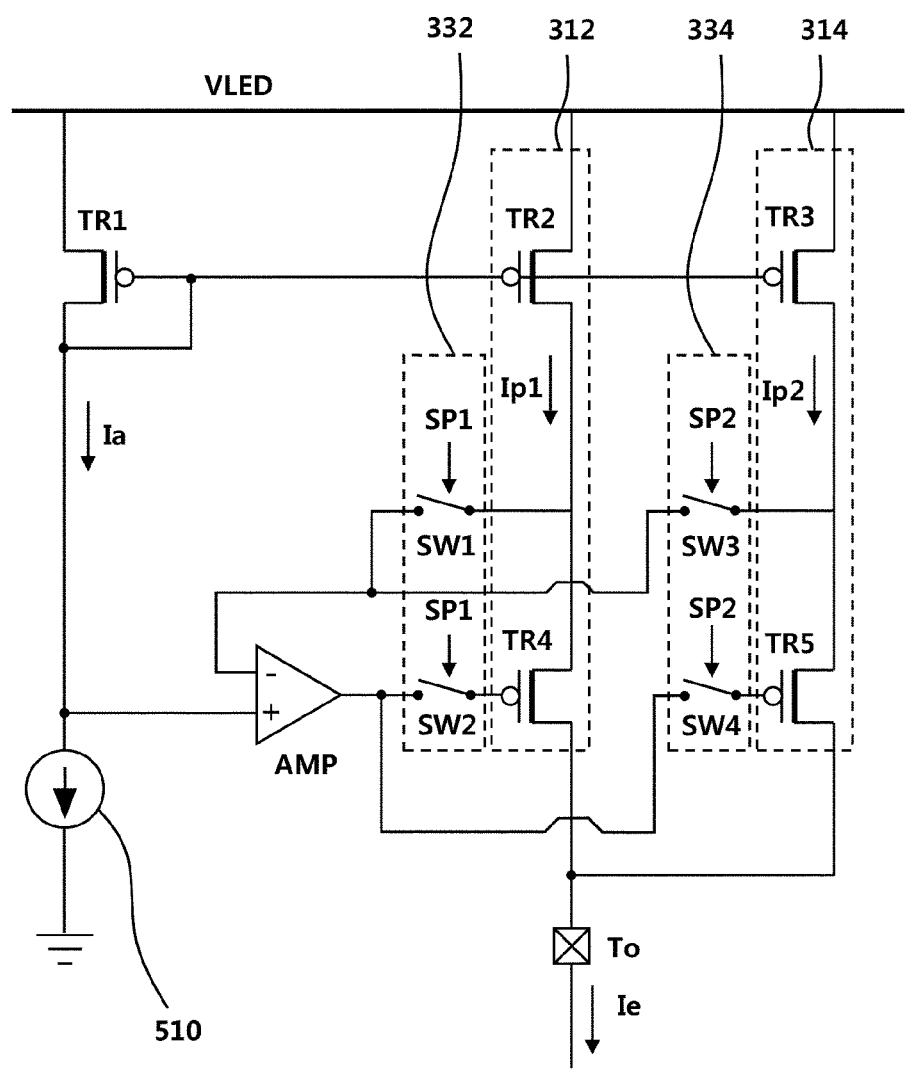
FIG. 5A is a diagram illustrating an example of the configuration of a driving current source circuit and a switch circuit part in the first example.
Figure 5B:
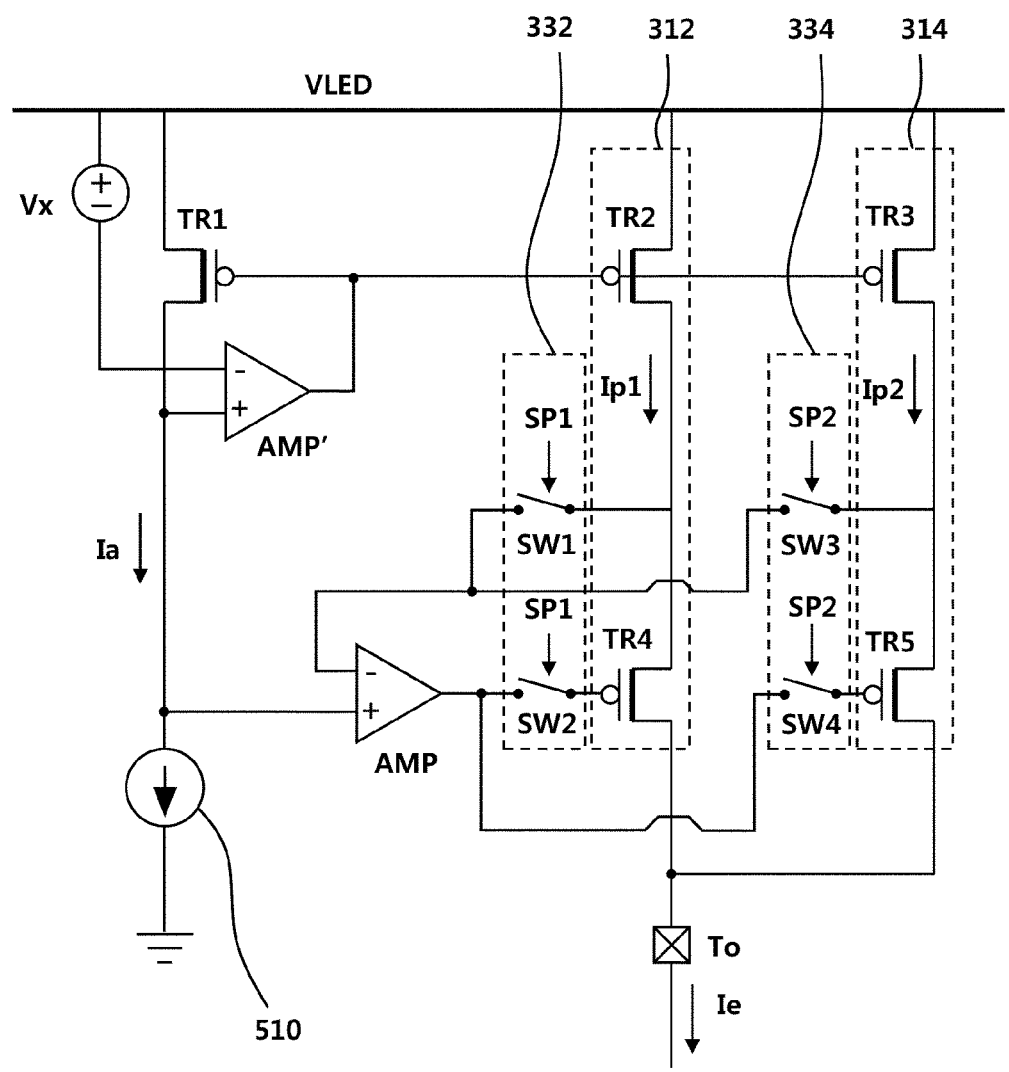
FIG. 5B is a diagram illustrating another example of the configuration of a driving current source circuit and a switch circuit part in the first example.

FIG. 5A is a diagram illustrating an example of the configuration of a driving current source circuit and a switch circuit part in the first example, and FIG. 5B is a diagram illustrating another example of the configuration of a driving current source circuit and a switch circuit part in the first example.

Referring to FIGS. 5A and 5B, the LED driving device may include a first transistor TR1 having a first terminal (e.g., a source terminal or a drain terminal) connected to a driving voltage VLED and a basic current source 510 connected to a second terminal (e.g., a drain terminal or a source terminal) of the first transistor TR1.

In addition, the first driving current source 312 and the second driving current source 314 of the LED driving device may be implemented in the form of a current mirror with respect to the basic current source 510.

The first driving current source 312 may form a current mirror structure with respect to the basic current source 510 using a second transistor TR2 having a gate commonly connected with the first transistor TR1 and a first terminal connected to the driving voltage VLED.

The second driving current source 314 may form a current mirror structure with respect to the basic current source 510 using a third transistor TR3 having a gate commonly connected with the first transistor TR1 and a first terminal connected to the driving voltage VLED.

The first driving current source 312 may further include a fourth transistor TR4 connected in series with the second transistor TR2, and the second driving current source 314 may further include a fifth transistor TR5 connected in series with the third transistor TR3. In addition, a gate of the fourth transistor TR4 may be connected to an output of an amplifier AMP to which the second terminal of the first transistor TR1 and the second terminal of the second transistor TR2 are connected as inputs. In addition, a gate of the fifth transistor TR5 may be connected to an output of an amplifier AMP to which the second terminal of the first transistor TR1 and the second terminal of the third transistor TR3 are connected as inputs.

The first switch circuit 332 may include a first switch SW1 for controlling the connection between the second terminal of the second transistor TR2 and the input of the amplifier AMP and a second switch SW2 for controlling the connection between the gate of the fourth transistor TR4 and the output of the amplifier AMP. In addition, the first switch SW1 and the second switch SW2 may be turned on and off by the first PWM signal SP1.

The second switch circuit 334 may include a third switch SW3 for controlling the connection between the second terminal of the third transistor TR3 and the input of the amplifier AMP and a fourth switch SW4 for controlling the connection between the gate of the fifth transistor TR5 and the output of the amplifier AMP. In addition, the third switch SW3 and the fourth switch SW4 may be turned on and off by the second PWM signal SP2.

Here, the first transistor TR1, the second transistor TR2, the third transistor TR3, the fourth transistor TR4, and the fifth transistor TR5 may be PNP type transistors Meanwhile, referring to the example in FIG. 5A, the gate of the first transistor TR1 and the second terminal may be connected to each other.

In addition, referring to the example in FIG. 5B, another amplifier AMP' may be further included. For convenience of explanation, if the aforementioned amplifier AMP is a first amplifier and another amplifier AMP' is a second amplifier, a voltage reduced by a voltage Vx from the driving voltage VLED may be applied as one input to the second amplifier AMP', and the other input may be in common with the input of the first amplifier AMP. In addition, the output of the second amplifier AMP' may be connected to the gate of the first transistor TR1. According to the above structure, one input voltage of the first amplifier AMP may be freely configured as VLED-Vx through the adjustable voltage Vx.

Although the first example describes an embodiment in which the number of driving current sources is two, the number of driving current sources may be two or more. In particular, if the gray scale value included in image data has a range corresponding to a power of 2, the number of the driving current sources may be N (N is a power of 2). For example, if the gray scale value is 0 to 255 or 0 to 512, the number of driving current sources may be a number corresponding to a power of 2, such as 2, 4, 8, . . . , and 16.

Figure 6:
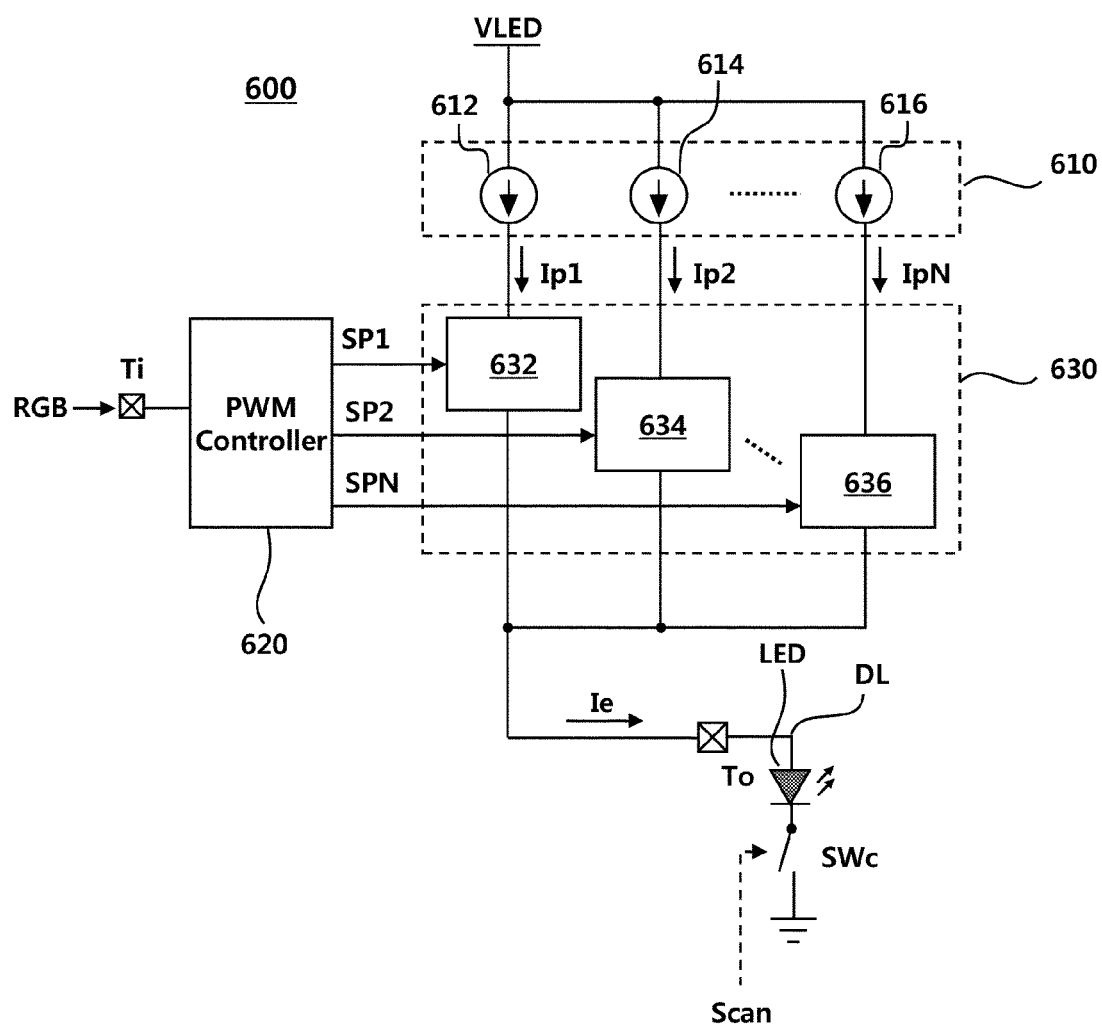
FIG. 6 is a diagram illustrating the configuration of an LED driving device according to a second example of an embodiment.

FIG. 6 is a diagram illustrating the configuration of an LED driving device according to a second example of an embodiment.

Referring to FIG. 6, the LED driving device 600 may include a driving current source circuit 610, a PWM controlling circuit 620, a switch circuit part 630, and the like.

The driving current source circuit 610 may include N driving current sources 612, 614, and 616. The N driving current sources 612, 614, and 616 may be connected in parallel with each other, and may supply driving currents Ip1, Ip2, and IpN to one LED LED connected to one driving line DL according to the scan signal. For example, the first driving current source 612 may supply a first driving current Ip1 to the driving line DL, the second driving current source 614 may supply a second driving current Ip2 to the driving line DL, and the Nth driving current source 616 may supply an Nth driving current IpN to the driving line DL. The currents supplied from the respective driving current sources may be combined into one driving current Ie to then flow to the driving line DL through an output terminal To.

The PWM controlling circuit 620 may receive image data RGB and a clock (not shown) through an input terminal Ti, and may read in the image data RGB according to the clock. In addition, the PWM controlling circuit 620 may convert a gray scale value included in the image data RGB into a plurality of PWM signals SP1, SP2, and SPN corresponding to the respective driving current sources according to the clock.

The PWM controlling circuit 620 may distribute the gray scale value to the first driving current source 612, the second driving current source 614, . . . , and the Nth driving current source 616, respectively. At this time, the PWM controlling circuit 620 may distribute the gray scale value to the respective driving current sources in the balanced way. For example, if the gray scale value is divided into N values, the PWM controlling circuit 620 may evenly distribute the gray scale value to the respective driving current sources.

The PWM controlling circuit 620 may distribute the quotient obtained by dividing the gray scale value or the gray scale value plus 1 by N to each of the driving current sources, and may distribute the remainder R thereof (R is 0 or a natural number less than N) to R selected driving current sources so as to have one each.

The PWM controlling circuit 620 may generate the PWM signals SP1, SP2, and SPN using the values distributed to the respective driving current sources. The PWM controlling circuit 620 may generate the first PWM signal SP1 using the value distributed to the first driving current source 612, may generate the second PWM signal SP2 using the value distributed to the second driving current source 614, and may generate the Nth PWM signal SPN using the value distributed to the Nth driving current source 616.

The switch circuit part 630 including a plurality of switch circuits 632, 634, and 636 may PWM-control the outputs of the driving current sources according to the respective PWM signals SP1, SP2, and SPN. For example, the first switch circuit 632 may control the output of the first driving current source 612 according to the first PWM signal SP1, and the second switch circuit 634 may control the output of the second driving current source 614 according to the second PWM signal SP2. In addition, the Nth switch circuit 636 may control the output of the Nth driving current source 616 according to the Nth PWM signal SPN.

The driving current Ie controlled according to the PWM signals SP1, SP2, and SPN may be supplied to the driving line DL through the output terminal To.

Figure 7:
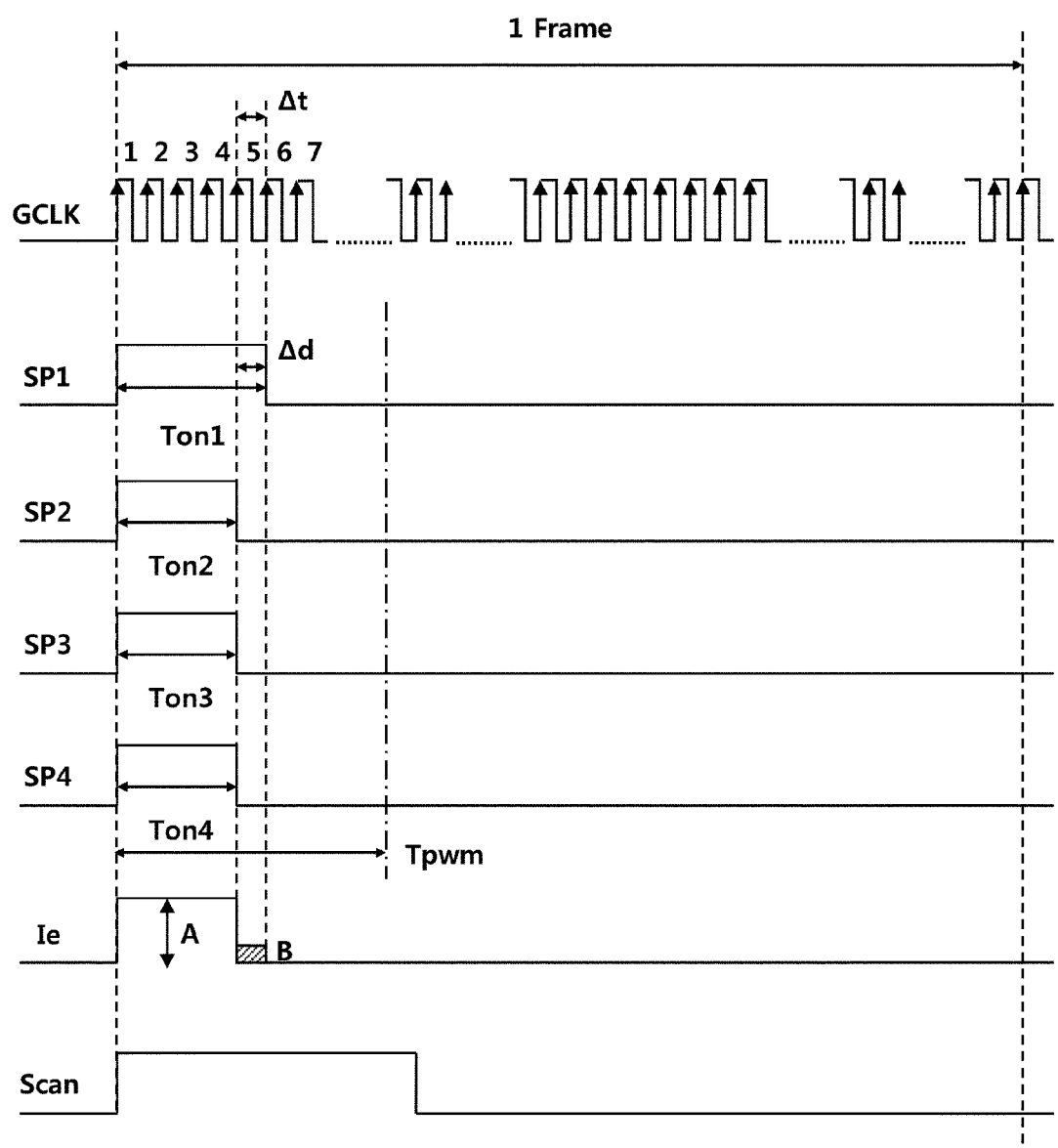
FIG. 7 is a diagram illustrating primary waveforms in the second example.

FIG. 7 is a diagram illustrating primary waveforms in the second example. FIG. 7 shows waveforms in the case where N is 4.

Referring to FIG. 7, the PWM control time Tpwm of the PWM signal SP1, SP2, SP3, or SP4 may be configured as an ON section and an OFF section. The LED driving device may supply the output of each driving current source to the driving line in the ON section, and may block the output of each driving current source in the OFF section. Although the diagram shows that the ON sections are positioned to overlap each other in one frame, the ON sections may be distributed and disposed in several parts. For example, if one frame is divided into two subframes for driving, the ON sections may be distributed and disposed in the respective subframes.

The LED driving device may have a clock GCLK, and may adjust the length of the ON section in the PWM signal SP1 or SP2 according to the clock GCLK. The LED driving device may adjust the length of the ON section by corresponding one unit of the gray scale value to one cycle $\Delta t$ of the clock GCLK. For example, if the gray scale value is 1, the length of the ON section may be equal to one cycle of the clock GCLK.

The LED driving device may adjust the length of the ON sections Ton1, Ton2, Ton3, and Ton4 of the first PWM signal SP1, the second PWM signal SP2, the third PWM signal SP3, and the fourth PWM signal SP4 in units of cycles $\Delta t$ of the clock GCLK such that the length of the ON section Ton1 of the first PWM signal, the length of the ON section Ton2 of the second PWM signal, the length of the ON section Ton3 of the third PWM signal, and the length of the ON section Ton4 of the fourth PWM signal are equal or such that the difference $\Delta d$ thereof is one clock cycle $\Delta t$.

For example, if the gray scale value included in image data RGB is 17, the LED driving device may configure the ON section of the first PWM signal to correspond to five clock cycles $\Delta t$, and may configure the ON section of the second PWM signal to correspond to four clock cycles $\Delta t$. In addition, the LED driving device may configure the ON section of the third PWM signal to correspond to four clock cycles $\Delta t$, and may configure the ON section of the fourth PWM signal to correspond to four clock cycles $\Delta t$.

The magnitude of the driving current Ie may be equal to the sum of the first driving current output from the first driving current source, the second driving current output from the second driving current source, the third driving current output from the third driving current source, and the fourth driving current output from the fourth driving current source. In this case, the current magnitude B in the section of the last clock cycle may have four levels of values, compared to the current magnitude A in other sections in which the driving current Ie is produced. For example, B may have a magnitude of 1/4A, 2/4A, 3/4A, or 4/4A. Accordingly, the fineness of the gray scale value may be increased by N times (4 times in FIG. 7) compared to the prior art. In this case, the magnitudes of the driving currents output from the respective driving current sources are assumed to be substantially the same.

In order to produce substantially the same magnitude of the driving current output from each driving current source, the driving current sources may be implemented in the form of a current mirror with respect to one common current source.

Figure 8:
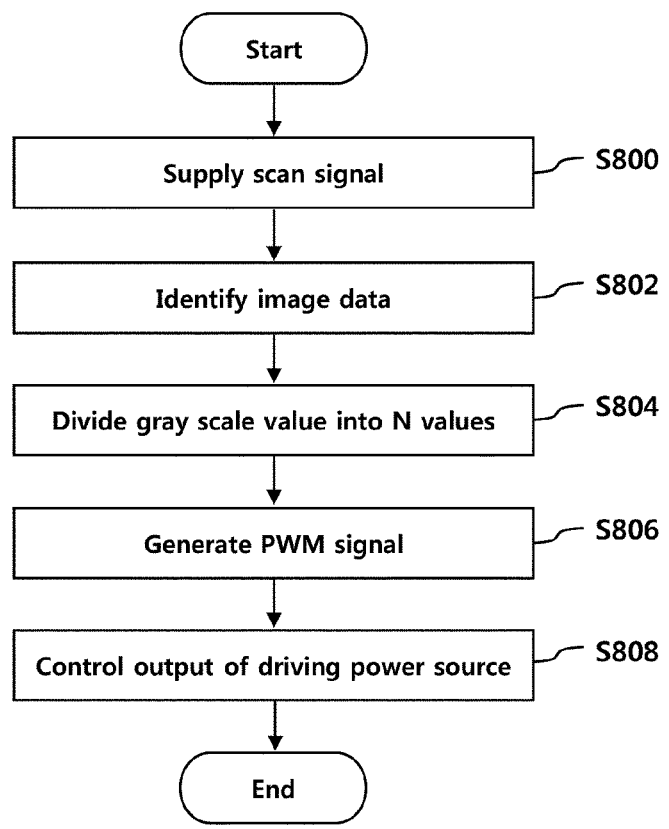
FIG. 8 is a flowchart illustrating a driving method of an LED according to a third example of an embodiment.

FIG. 8 is a flowchart illustrating a driving method of an LED according to a third example of an embodiment.

LEDs arranged on the panel may be driven in units of scan lines, and each scan line may be selected according to a scan signal. The LED driving device may have a plurality of channels, and each channel may be connected to one driving line. In this structure, one LED may be connected to one driving line according to a scan signal (S800).

In addition, the LED driving device may identify image data that includes a gray scale value for one LED connected to one driving line (S802).

In addition, the LED driving device may divide the gray scale value into N values (N is a natural number of 2 or more) (S804).

In addition, the LED driving device may generate a plurality of PWM signals according to the divided gray scale values (S806).

In addition, the LED driving device may control outputs of the N driving current sources connected to one driving line according to the plurality of PWM signals (S808).

In step S808 of controlling the outputs of the N driving power sources, the LED driving device may divide one frame into two subframes, and may control the outputs such that the N driving current sources have the same ON section in the first subframe and such that the difference between the ON sections of the N driving current sources is within one clock cycle.

Figure 9:
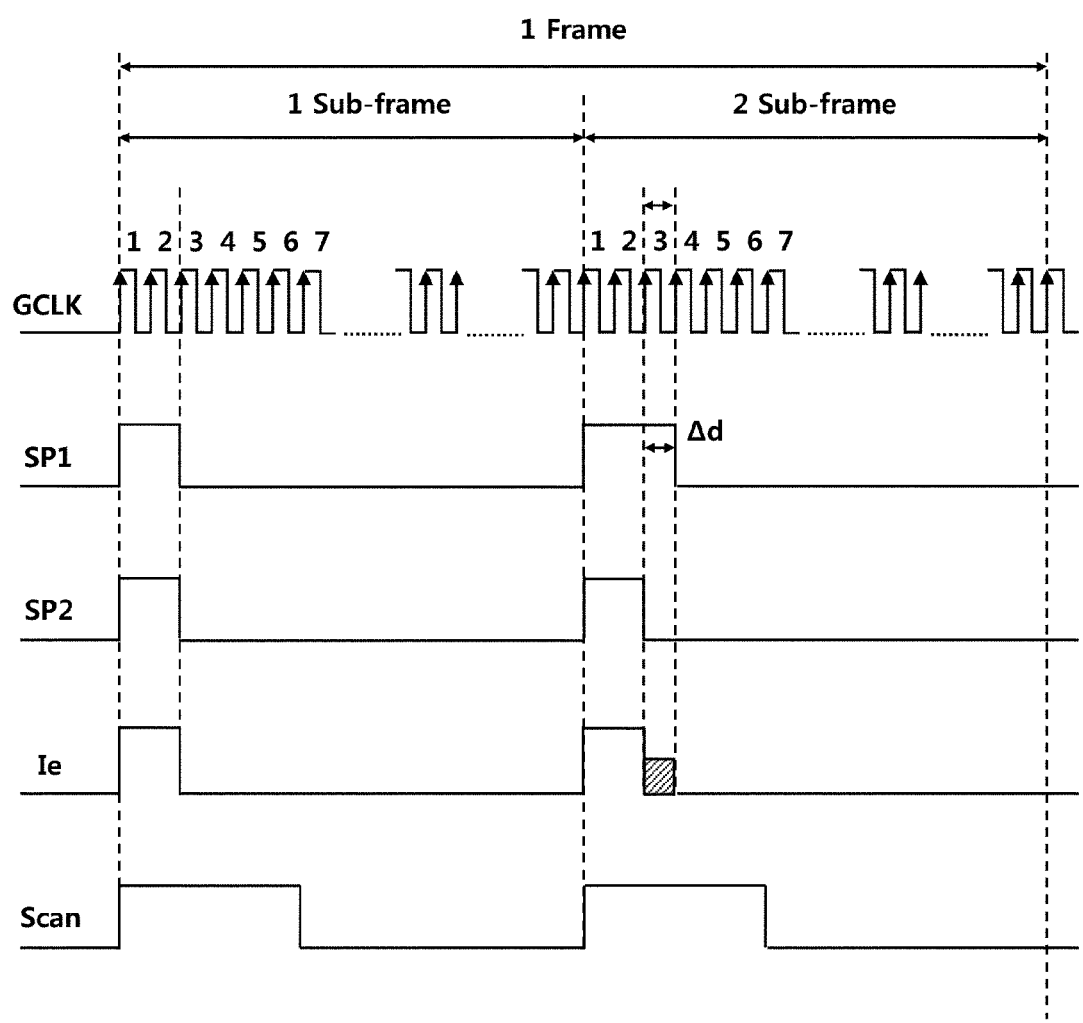
FIG. 9 is a diagram illustrating primary waveforms in the third example.

FIG. 9 is a diagram illustrating primary waveforms in the third example.

Referring to FIG. 9, the LED driving device may distribute and dispose the ON sections of the PWM signals SP1 and SP2 in a plurality of subframes. In addition, the LED driving device may perform configuration such that the PWM signals SP1 and SP2 have the same ON section in one subframe and such that the difference in the length of the ON section between the PWM signals SP1 and SP2 is within one clock cycle in another subframe.

For example, in the case where one frame is divided into two subframes, where two driving current sources are provided, and where the gray scale value is 9, the LED driving device may first distribute the gray scale value to the two subframes in the balanced way. In other words, the LED driving device may perform control such that the difference between the gray scale values distributed to the subframes is 1 or less. In the example in FIG. 9, a gray scale value of 4 is distributed to the first subframe, and a gray scale value of 5 is distributed to the second subframe.

In addition, the LED driving device may redistribute the gray scale value, which is distributed to each subframe, to the respective driving current sources in the balanced way. In other words, when redistributing the gray scale value, which is distributed to each subframe, to the respective driving current sources, the LED driving device may perform control such that the difference between the redistributed gray scale values is 1 or less.

In FIG. 9, control is performed such that the lengths of the ON sections of the PWM signal SP1 and SP2 are the same in the first subframe and such that the difference Δd in the length of the ON section between the first PWM signal SP1 and the second PWM signal SP2 is one clock cycle Δt in the second subframe. According to the above control, the range of gray scale values capable of being expressed by the driving current Ie may be doubled.

There may be M subframes (M is a natural number of 2 or more) disposed in one frame, and the LED driving device may perform control such that the difference between the gray scale values distributed to the respective driving power sources is within 1 in each subframe or such that the difference in the length of the ON section between the PWM signals of the respective driving power sources is within one clock cycle in each subframe.

In addition, the LED driving device may perform control such that the difference in the sum of gray scale values assigned to each subframe is within 1 or such that the difference in the total length of the ON sections of the PWM signal of each driving power source is within one clock cycle in each subframe.

In terms of distribution of the gray scale values, the LED driving device may equally distribute the gray scale value to the respective subframes, and may equally redistribute the gray scale value, which is distributed to each subframe, to the respective driving power sources.

Meanwhile, although not described above, the circuit that generates the PWM signal in the PWM controlling circuit may be configured as a logic circuit that performs a binary number operation.

What is claimed is:

1. A light emitting diode (LED) driving device for driving a plurality of LEDs arranged on a panel, the LED driving device comprising:
    a plurality of driving current sources connected in parallel to each other;
    a pulse width modulation (PWM) controlling circuit configured to generate a plurality of PWM signals according to a gray scale value for an LED; and
    a plurality of switch circuits configured to control an output of each driving current source for the LED according to each PWM signal,
    wherein each driving current source supplies each driving current to one driving line, and wherein the driving current flowing through the one driving line is a sum of outputs of the driving current sources.

2. The LED driving device of claim 1, wherein a PWM signal comprises an ON section and an OFF section, wherein the length of the ON section is adjusted in units of cycles of a clock.

3. The LED driving device of claim 2, wherein a difference in the length of the ON section between the PWM signals is within the length of one cycle of the clock.

4. The LED driving device of claim 1, wherein the gray scale value has a range corresponding to 2 to the power of N (N is a natural number) and the number of the plurality of driving current sources is N.

5. The LED driving device of claim 1, wherein the number of the plurality of driving current sources is N and the PWM controlling circuit is configured to assign a value of a quotient, obtained by dividing the gray scale value by N, to each of the driving current sources and distribute a remainder R (R is 0 or a natural number less than N) respectively to R driving current sources to generate the plurality of PWM signals.

6. The LED driving device of claim 1, wherein the levels of the driving currents outputted from respective driving current sources are substantially identical.

7. The LED driving device of claim 1, wherein the plurality of driving current sources are implemented in a form of current mirrors with respect to one common current source.

8. An LED driving device for driving an LED arranged on a panel, the LED driving device comprising:
    a first driving current source supplying a first driving current to one driving line;
    a second driving current source connected in parallel to the first driving current source and supplying a second driving current to the one driving line;
    a PWM controlling circuit configured to generate a first PWM signal and a second PWM signal by distributing a gray scale value for the LED;
    a first switch circuit configured to control an output of the first driving current source for the LED according to the first PWM signal; and
    a second switch circuit configured to control an output of the second driving current source for the LED according to the second PWM signal,
    wherein the driving current flowing through the one driving line is a sum of the first driving current and the second driving current.

9. The LED driving device of claim 8, wherein the PWM controlling circuit is configured to adjust the lengths of ON sections of the first PWM signal and the second PWM signal in units of cycles of a clock.

10. The LED driving device of claim 9, wherein the PWM controlling circuit controls the first PWM signal and the second PWM signal such that the lengths of their ON sections are identical to each other or such that a difference in the length of the ON section therebetween is within the length of one cycle of the clock.

11. The LED driving device of claim 8, further comprising a first transistor having a first terminal connected to a driving voltage and a basic current source connected to a second terminal of the first transistor,
    wherein the first driving current source forms a current mirror structure with respect to the basic current source using a second transistor having a gate commonly connected with the first transistor and a first terminal connected to the driving voltage, and
    wherein the second driving current source forms a current mirror structure with respect to the basic current source using a third transistor having a gate commonly connected with the first transistor and a first terminal connected to the driving voltage.

12. The LED driving device of claim 11, wherein the first driving current source further comprises a fourth transistor connected in series with the second transistor and the second driving current source further comprises a fifth transistor connected in series with the third transistor, wherein a gate of the fourth transistor is connected to an output terminal of a first amplifier to which a second terminal of the first transistor and a second terminal of the second transistor are connected as input terminals, and wherein a gate of the fifth transistor is connected to an output terminal of a second amplifier to which a second terminal of the first transistor and a second terminal of the third transistor are connected as input terminals.

13. The LED driving device of claim 12, wherein the first switch circuit comprises a first switch configured to control the connection between the second terminal of the second transistor and the first amplifier and a second switch configured to control the connection between the gate of the fourth transistor and the first amplifier and the second switch circuit comprises a third switch configured to control the connection between the second terminal of the third transistor and the second amplifier and a fourth switch configured to control the connection between the gate of the fifth transistor and the second amplifier, wherein the first amplifier and the second amplifier have the same property.

14. The LED driving device of claim 12, wherein the first transistor, the second transistor, the third transistor, the fourth transistor, and the fifth transistor are PNP type transistors.

15. A method of driving a plurality of LEDs arranged on a panel, the method comprising:
connecting one LED to one driving line according to a scan signal;
identifying image data comprising a gray scale value for the one LED;
dividing the gray scale value into N gray scale values (N is a natural number of 2 or higher) and generating a plurality of PWM signals according to the divided gray scale values; and
controlling outputs of N driving current sources connected to the one driving line according to the plurality of PWM signals,
wherein the N driving current sources are connected in parallel to each other, and wherein the driving current flowing through the one driving line is a sum of the outputs of the driving current sources.

16. The method of claim 15, wherein controlling the outputs of the N driving current sources comprises dividing one frame into M subframes (M is a natural number of 2 or higher), controlling the outputs of the N driving current sources such that (M−1) subframes respectively have ON sections having a same length, and controlling the outputs of the N driving current sources such that one remaining subframe has an ON section having a length different from the lengths of the ON sections in the (M−1) subframes by the length of one cycle of a clock.

17. The method of claim 15, wherein controlling the outputs of the N driving current sources comprises dividing one frame into M subframes (M is a natural number of 2 or higher) and controlling the outputs of the N driving current sources such that a difference between two ON sections of two driving current sources is within one clock cycle in each subframe and such that a difference between any two sums of the ON sections of the N driving current sources assigned to two subframes is within one clock cycle.

* * * * *